(12) United States Patent
Hosokai et al.

(10) Patent No.: US 12,055,979 B2
(45) Date of Patent: Aug. 6, 2024

(54) KEYBOARD, STAND, AND KEYBOARD-STAND SET

(71) Applicant: LENOVO (SINGAPORE) PTE. LTD., Singapore (SG)

(72) Inventors: Tatsuya Hosokai, Yokohama (JP); Muneki Sugiyama, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 18/068,496

(22) Filed: Dec. 19, 2022

(65) Prior Publication Data

US 2023/0259175 A1    Aug. 17, 2023

(30) Foreign Application Priority Data

Feb. 17, 2022   (JP) .................. 2022-022875

(51) Int. Cl.
  *G06F 1/16*  (2006.01)
  *G06F 3/02*  (2006.01)
  *G06F 3/023* (2006.01)

(52) U.S. Cl.
  CPC .......... *G06F 1/1669* (2013.01); *G06F 1/1632* (2013.01); *G06F 1/166* (2013.01); *G06F 1/1667* (2013.01); *G06F 3/0202* (2013.01); *G06F 3/0208* (2013.01)

(58) Field of Classification Search
  CPC ........ G06F 1/16; G06F 1/1616; G06F 1/1624; G06F 1/1628; G06F 1/1632; G06F 1/1633; G06F 1/166; G06F 1/1662; G06F 1/1667; G06F 1/1669; G06F 1/1671; G06F 1/1681; G06F 3/0208; G06F 3/0231; G06F 2200/1633; G06F 1/18; A45C 2011/003; H05K 5/0234
  See application file for complete search history.

(56) References Cited

U.S. PATENT DOCUMENTS

| | | | |
|---|---|---|---|
| 4,976,559 A * | 12/1990 | Inagaki | G06F 3/0202 D18/54 |
| 7,566,043 B2 * | 7/2009 | Chen | G06F 1/1616 248/677 |
| 8,599,542 B1 | 12/2013 | Zagg | |
| 8,817,457 B1 | 8/2014 | Zagg | |
| 9,134,765 B2 * | 9/2015 | Wang | G06F 1/1613 |
| 9,594,400 B2 * | 3/2017 | Li | G06F 1/1616 |

(Continued)

FOREIGN PATENT DOCUMENTS

JP    2015087908 A    5/2015

*Primary Examiner* — Adrian S Wilson
*Assistant Examiner* — Gage Crum
(74) *Attorney, Agent, or Firm* — SHIMOKAJI IP

(57) ABSTRACT

A keyboard includes: a recessed portion formed along a rear edge and open from a rear surface to a bottom surface; and a magnet located at a recessed portion top surface. A stand includes: a frame body that abuts a rear surface of an electronic apparatus; a plate connected to part of the frame body via a torque hinge, and having a distal edge abutting a placement surface in a state of being open relative to a frame surface of the frame body; a band portion connected to a long-side frame of the frame body along the long-side frame, and having a width that allows side surfaces of the electronic apparatus to be supported; and a bar of an iron material located along a distal edge of the band portion.

10 Claims, 14 Drawing Sheets

(56) References Cited

U.S. PATENT DOCUMENTS

| | | | | |
|---|---|---|---|---|
| 10,031,557 B1* | 7/2018 | Morrison | | G06F 1/189 |
| 11,630,489 B2* | 4/2023 | Thome | | G06F 1/1618 |
| | | | | 361/679.27 |
| 2007/0097087 A1* | 5/2007 | Homer | | G06F 1/1632 |
| | | | | 345/173 |
| 2011/0222233 A1* | 9/2011 | Lu | | G06F 1/166 |
| | | | | 361/679.21 |
| 2012/0287565 A1* | 11/2012 | Bennett, Jr. | | A45C 13/005 |
| | | | | 361/679.01 |
| 2012/0293953 A1* | 11/2012 | Wu | | A45C 11/00 |
| | | | | 361/679.56 |
| 2013/0016467 A1* | 1/2013 | Ku | | F16M 11/10 |
| | | | | 361/679.08 |
| 2014/0118916 A1* | 5/2014 | Lin | | G06F 1/166 |
| | | | | 361/679.09 |
| 2014/0211393 A1* | 7/2014 | Lee | | G06F 1/1632 |
| | | | | 361/679.12 |
| 2015/0153791 A1* | 6/2015 | Wong | | G06F 1/1628 |
| | | | | 361/679.54 |
| 2016/0349801 A1* | 12/2016 | Liang | | G06F 1/1669 |
| 2017/0060180 A1* | 3/2017 | Griffin, II | | G06F 1/1669 |
| 2017/0086328 A1* | 3/2017 | Ly | | A47B 23/04 |
| 2018/0329459 A1* | 11/2018 | Singla | | G06F 1/1616 |
| 2019/0212784 A1* | 7/2019 | Oakeson | | G06F 1/1669 |
| 2020/0089285 A1* | 3/2020 | Gilbert | | G06F 1/1632 |
| 2020/0190877 A1* | 6/2020 | Zhai | | G06F 1/1628 |
| 2021/0072839 A1* | 3/2021 | Brinkmann | | A63F 13/24 |
| 2021/0089077 A1* | 3/2021 | Wang | | G06F 1/3287 |

\* cited by examiner

KEYBOARD, STAND, AND KEYBOARD-STAND SET

BACKGROUND OF THE INVENTION

Field of the Invention

The present invention relates to a keyboard that performs wireless input to an electronic apparatus, a stand that supports the electronic apparatus in an upright state, and a keyboard-stand set composed of the keyboard and the stand.

Description of the Related Art

Thin electronic apparatuses such as tablet personal computers (PCs) that have touch panel displays without physical keyboards are widely used in recent years. A thin electronic apparatus is easy to carry and is easy to operate because input operation can be performed using a touch panel. However, since the thin electronic apparatus does not have a physical keyboard, for example inputting long text may be difficult.

In view of this, the applicant of the present application proposes a keyboard device to which a thin electronic apparatus is detachably attachable and that functions as a stand for a tablet PC, in Japanese Unexamined Patent Application Publication No. 2015-87908.

SUMMARY OF THE INVENTION

A thin electronic apparatus is sometimes used for video viewing. In video viewing, a keyboard is not needed and only a stand is needed. Thus, for video viewing, it is desirable that the keyboard and the stand are separate. For input of long text, on the other hand, it is desirable that the keyboard and the stand are integrated. Against this background, there is a demand for a structure in which the keyboard and the stand are detachable. Here, the keyboard and the stand need to be easily attached and detached, and also it is desirable that the keyboard and the stand are stably fixed to each other when integrated.

In view of the foregoing problems, the present invention has an object of providing a keyboard and a stand that are easily attachable and detachable and are stable when integrated, and a keyboard-stand set composed of the keyboard and the stand.

To solve the foregoing problems and achieve the stated object, a keyboard according to a first aspect of the present invention is a keyboard that performs wireless input to an electronic apparatus, the keyboard including: a recessed portion that is formed along a rear edge and is open from a rear surface to a bottom surface; and a magnet that is located at a recessed portion top surface which is a top surface of the recessed portion.

The recessed portion top surface may be planar.

The keyboard may include a leg portion that is detachably fitted into the recessed portion along the recessed portion and fixed by attraction by a member attracted by the magnet, in a state in which part of the leg portion protrudes from the bottom surface. Attaching such a leg portion allows the keyboard to have an appropriate elevation angle and thus eases key input.

A stand according to a second aspect of the present invention is a stand that supports an electronic apparatus in an upright state, the stand including: a frame body that abuts a rear surface of the electronic apparatus; a leg portion that is connected to part of the frame body via a torque hinge, and partly abuts a placement surface in a state of being open relative to a frame surface of the frame body; a flexible band portion that is connected to one edge of the frame body along the edge, and has a width that allows side surfaces of the electronic apparatus to be supported; and a bar that is located along a distal edge of the band portion opposite to an edge connected to the frame body, wherein the bar is a material that is attracted by a magnet.

The bar may be an iron material.

The band portion may be formed by pasting together two cloth materials elastic in a thickness direction, and the cloth materials may extend continuously to cover the frame body and the bar.

The bar may be a round bar.

The torque hinge may be connected to the leg portion at an edge of the frame body on a side farther from the band portion, and the leg portion may have a rectangular shape that closes an opening of the frame body when fitted into the opening.

An anti-slip material may be provided on a surface of the band portion.

The electronic apparatus may include a magnet, and the frame body may include a magnet at a position where the magnet is attractable by the magnet of the electronic apparatus.

A keyboard-stand set according to a third aspect of the present invention is a keyboard-stand set including: a keyboard that performs wireless input to an electronic apparatus; and a stand that supports the electronic apparatus in an upright state, wherein the keyboard includes: a recessed portion that is formed along a rear edge and is open from a rear surface to a bottom surface; and a magnet that is located at a recessed portion top surface which is a top surface of the recessed portion, wherein the stand includes: a frame body that abuts a rear surface of the electronic apparatus; a leg portion that is connected to part of the frame body via a torque hinge, and partly abuts a placement surface in a state of being open relative to a frame surface of the frame body; a flexible band portion that is connected to one edge of the frame body along the edge, and has a width that allows side surfaces of the electronic apparatus to be supported; and a bar that is located along a distal edge of the band portion opposite to an edge connected to the frame body, wherein the bar is a material that is attracted by the magnet, and wherein the recessed portion has a width and a height that allow the bar to be inserted therein.

The keyboard-stand set may include a leg portion that is detachably fitted into the recessed portion along the recessed portion and fixed by attraction by a member attracted by the magnet, in a state in which part of the leg portion protrudes from the bottom surface, and the bar or the leg portion may be selectively attached to the recessed portion.

According to the above-described aspects of the present invention, the stand and the keyboard can be easily attached to each other by simply inserting the bar of the stand into the recessed portion of the keyboard. Moreover, when integrated, the stand and the keyboard can be stably fixed to each other by the action of attraction between the bar and the magnet. The force by which the bar is attracted by the magnet is appropriately limited, and the bar can be easily pulled out.

DETAILED DESCRIPTION OF THE INVENTION

A keyboard-stand set 10, a keyboard 12, and a stand 14 according to an embodiment of the present invention will be described in detail below, with reference to the drawings. The present invention is not limited by this embodiment.

Figure 1:
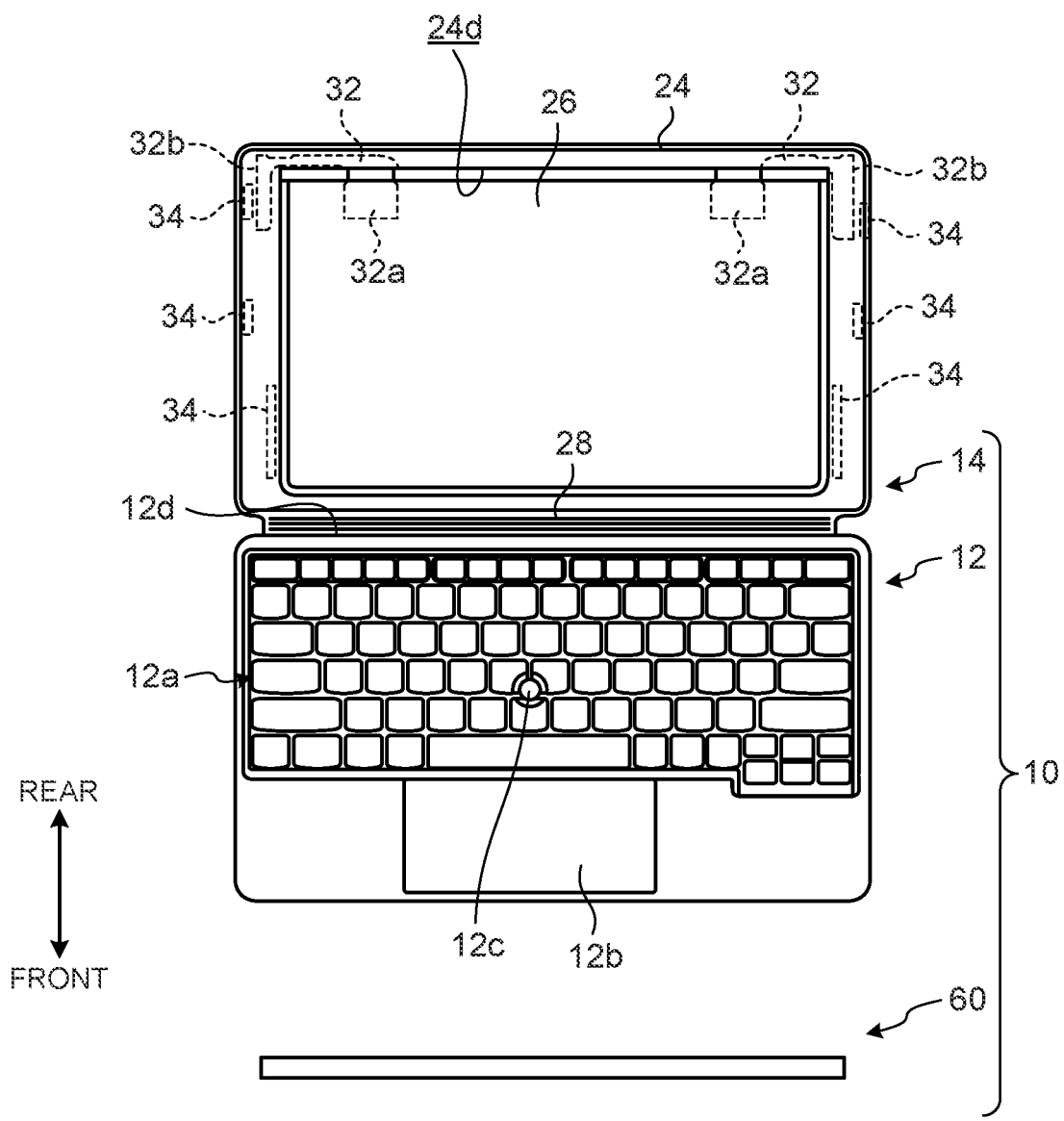
FIG. 1 is a plan view illustrating a keyboard-stand set according to an embodiment of the present invention.
Figure 2:
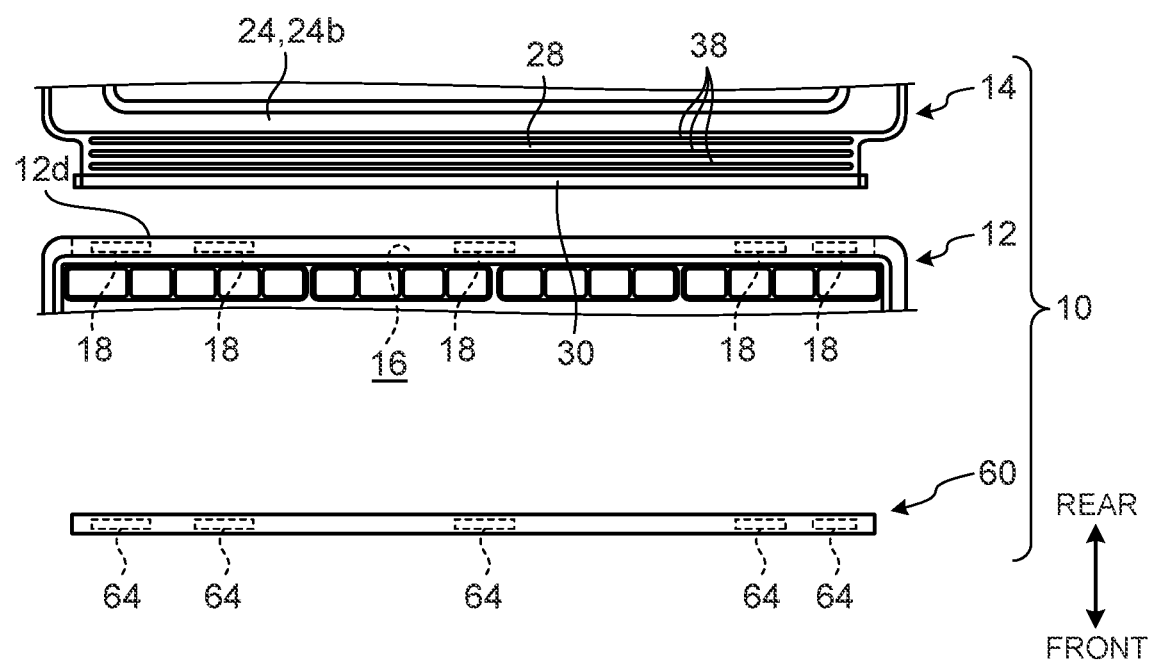
FIG. 2 is a partially enlarged plan view of the keyboard-stand set in a state in which the keyboard and the stand are separated.
Figure 3:
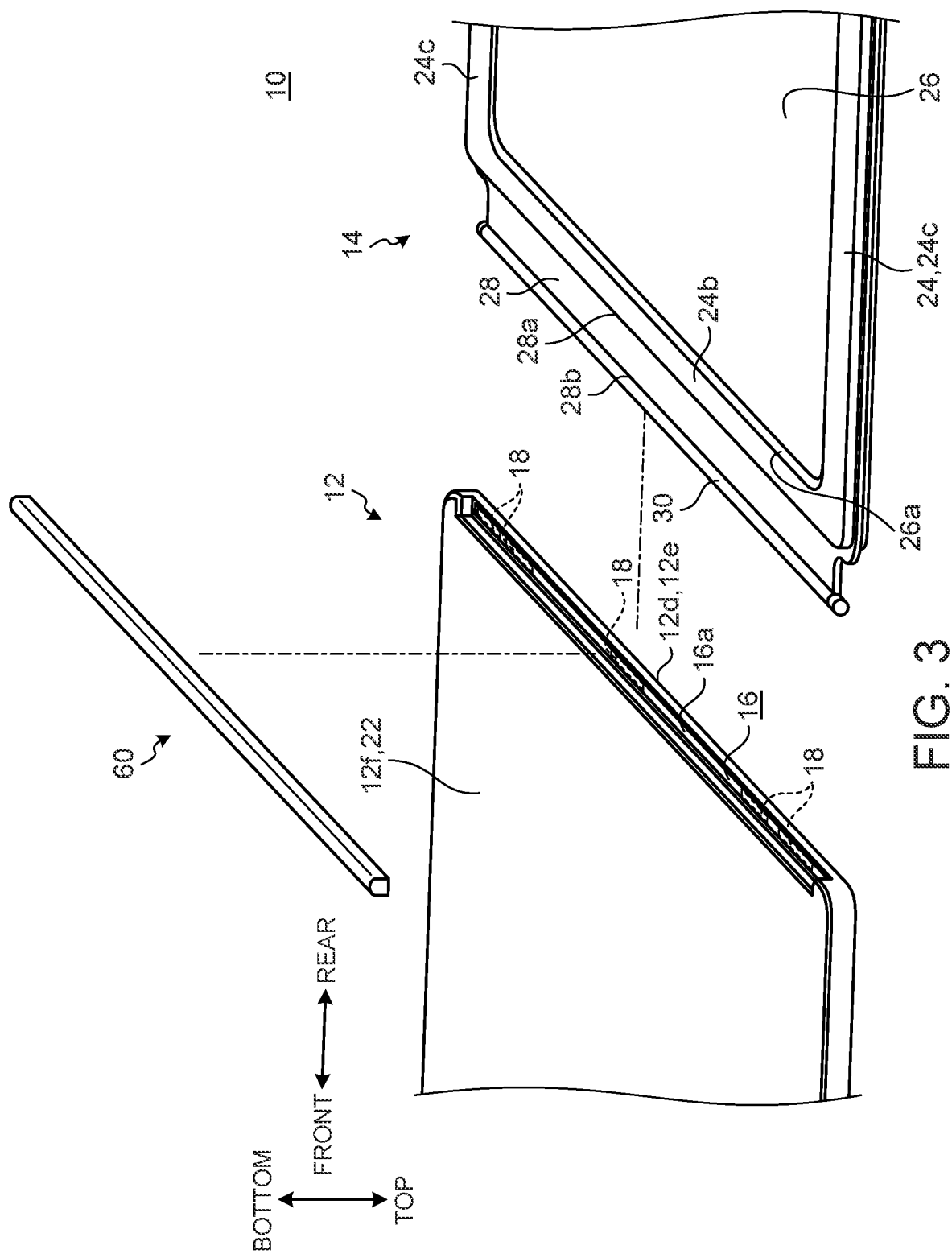
FIG. 3 is a perspective view of the keyboard and the stand as seen from below.
Figure 4:
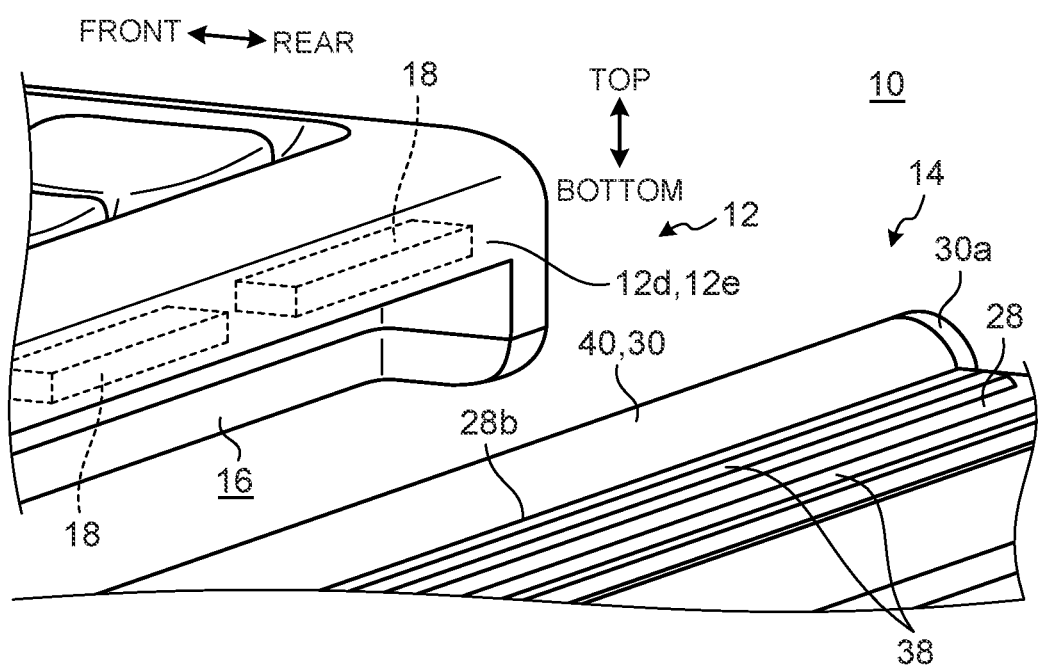
FIG. 4 is an enlarged perspective view of the ends of the keyboard and the stand as seen from above.
Figure 5:
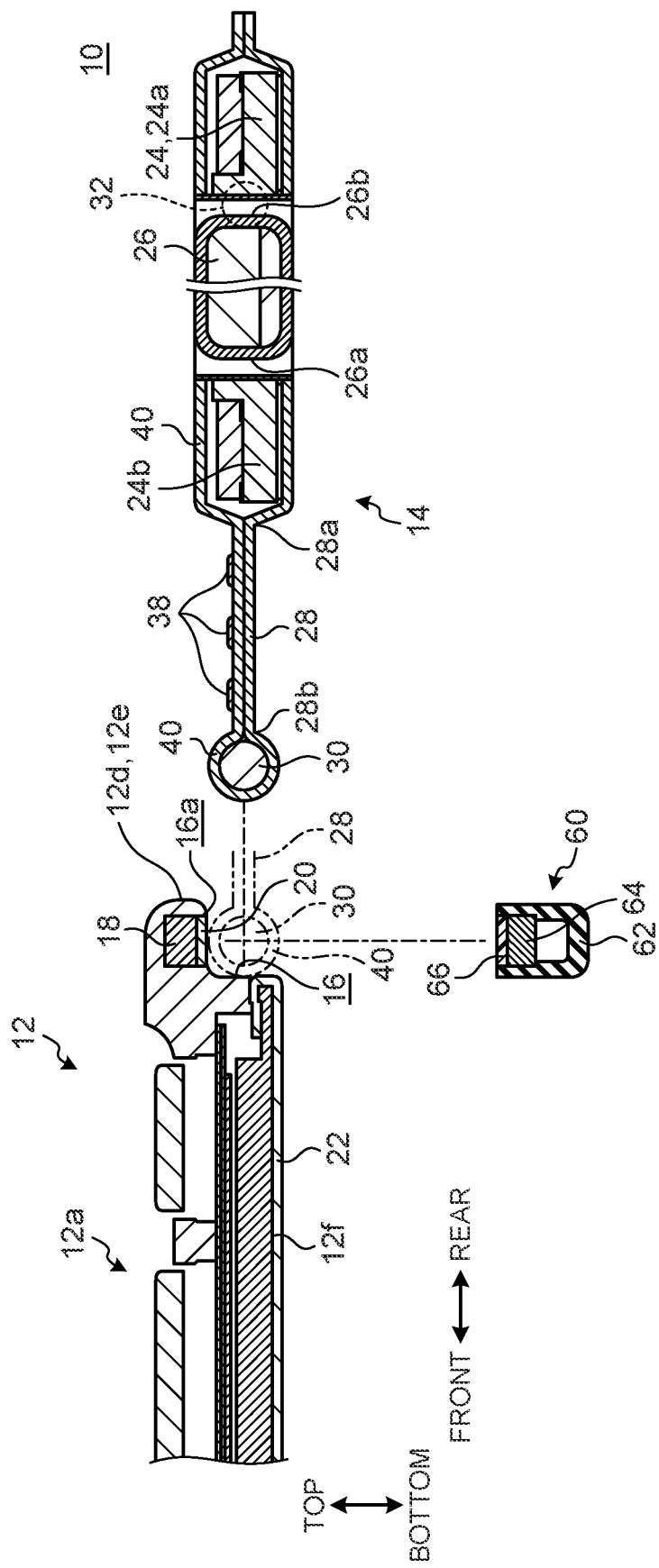
FIG. 5 is a sectional side view of the keyboard and stand.

FIG. 1 is a plan view illustrating the keyboard-stand set 10 according to the embodiment of the present invention. FIG. 2 is a partially enlarged plan view of the keyboard-stand set 10 in a state in which the keyboard 12 and the stand 14 are separated. FIG. 3 is a perspective view of the keyboard 12 and the stand 14 as seen from below. FIG. 4 is an enlarged perspective view of the ends of the keyboard 12 and the stand 14 as seen from above. FIG. 5 is a sectional side view of the keyboard 12 and the stand 14. The keyboard-stand set 10 is composed of the keyboard 12, the stand 14, and a leg portion 60.

First, the keyboard 12 will be described below. The keyboard 12 is a device that performs wireless input to an electronic apparatus. As the electronic apparatus, a portable computer without a physical keyboard is mainly used. Examples of the electronic apparatus include thin electronic apparatuses such as a foldable PC, a tablet PC, and a smartphone. Wireless communication between the keyboard 12 and the electronic apparatus is, for example, Bluetooth (registered trademark) or USB.

The keyboard 12 has a flat box shape of a typical size. A plurality of keys 12a aligned, a touchpad 12b, and a pointing stick 12c are provided on the top surface of the keyboard 12. The touchpad 12b is located in front of the keys 12a. The pointing stick 12c is an input device that is one type of pointing device for moving a cursor in a tilting direction, and is located substantially at the center of the plurality of keys 12a. Herein, regarding the directions with respect to the keyboard 12, the side on which the keys 12a, the touchpad 12b, and the pointing stick 12c are located is the top, and the opposite placement surface side is the bottom. Moreover, the side closer to the user during use, i.e. the side on which the space key and the touchpad 12b are located, is the front, and the opposite side is the rear.

The keyboard 12 is illustrated as compact type without a numeric keypad in this embodiment, but may be full-size type with a numeric keypad, independent cursor keys, and the like. The keyboard 12 includes a battery. The touchpad 12b and the pointing stick 12c may be omitted from the keyboard 12.

The keyboard 12 has a recessed portion 16 that is formed along the rear edge 12d and is open from the rear surface 12e to the bottom surface 12f. The recessed portion 16 is formed substantially throughout the length of the rear edge 12d. The rear surface 12e except the recessed portion 16 is thin. The recessed portion 16 can have the below-described bar 30 or leg portion 60 selectively attached thereto, and has such a height and length that allow each of the bar 30 and the leg portion 60 to be inserted therein. The recessed portion 16 has a substantially rectangular cross section as seen from the side (see FIG. 5), and the recessed portion top surface 16a is planar.

A plurality of magnets 18 are provided at the recessed portion top surface 16a. In this embodiment, a total of five magnets 18, i.e. two near each end of the recessed portion top surface 16a and one at the center of the recessed portion top surface 16a, are provided, as illustrated in FIGS. 2 and 3. The number, positions, and sizes of the magnets 18 are not limited to such. For example, a plurality of magnets 18 may be continuously arranged at the center. Since the magnets 18 are provided at the recessed portion top surface 16a, the arrangement layout of the keys 12a is unaffected. The bottom surface of each magnet 18 is covered with a thin cover 20 forming the recessed portion top surface 16a. Alternatively, the bottom surface of each magnet 18 may be exposed on the recessed portion top surface 16a. A cloth material 22 is pasted to the bottom surface 12f of the keyboard 12.

Figure 6:
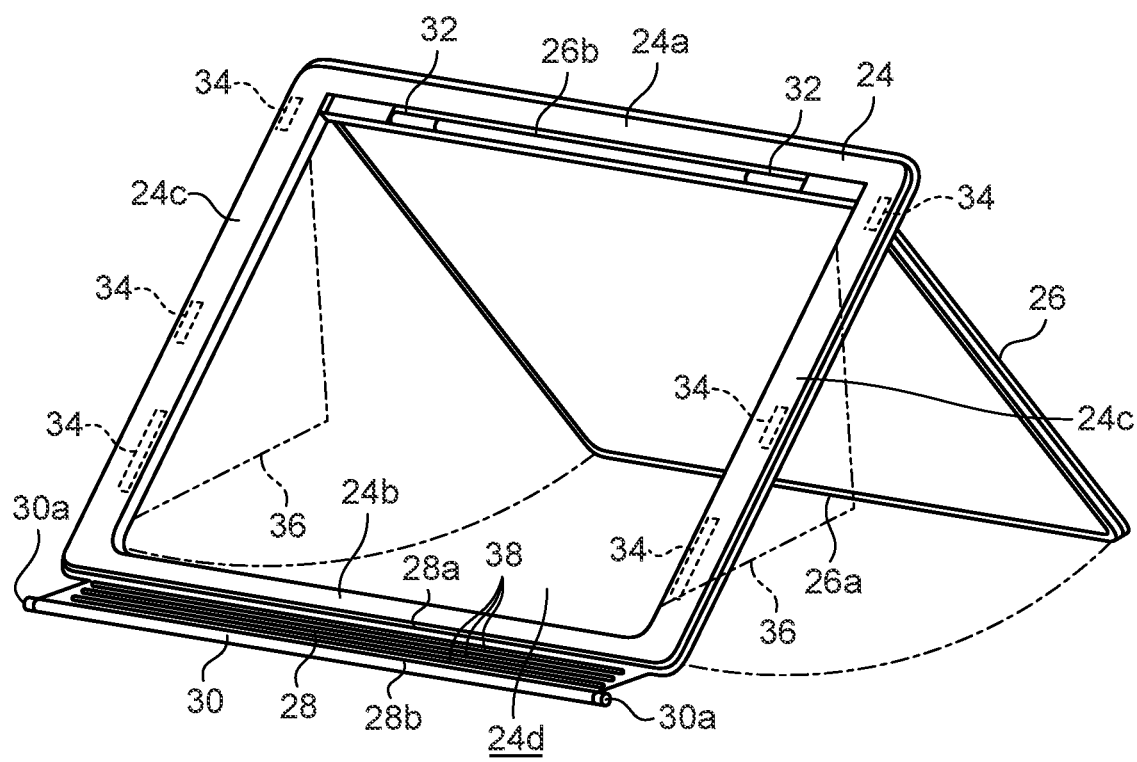
FIG. 6 is a perspective view of the stand in an upright state.

The stand 14 will be described below. FIG. 6 is a perspective view of the stand 14 in an upright state. The stand 14 supports the electronic apparatus in an upright state.

The stand 14 includes a frame body 24, a plate 26, a band portion 28, and the bar 30, as illustrated in FIG. 6. The frame body 24 is a part that abuts the rear surface of the electronic apparatus. The rear surface is basically the surface opposite to the display surface. The outer contour of the frame body 24 is substantially the same as that of the keyboard 12 in a plan view. A plurality of magnets 34 are embedded in the frame body 24 decentrally. The below-described electronic apparatus 50 has magnets at its rear surface, and the magnets 34 of the frame body 24 are arranged at positions where they are attractable by the magnets of the electronic apparatus 50.

The plate 26 is connected to one long-side frame 24a of the frame body 24 via a pair of left and right torque hinges 32, and is rotatable about the torque hinges 32. The long-side frame 24a forms the edge of the frame body 24 farther from the band portion 28. The plate 26 has a rectangular shape that closes the opening 24d of the frame body 24 with substantially no gap when fitted into the opening 24d (see FIG. 1). The plate 26 can be maintained at any angle with respect to the frame body 24 by the torquing action of the torque hinges 32. The plate 26 acts as a leg portion with its distal edge 26a abutting a placement surface G (see FIG. 9A) in a state in which the plate 26 is open relative to the frame surface of the frame body 24. The distal edge 26a is the edge opposite to the proximal edge 26b connected to the torque hinges 32. The plate 26 opens only in one direction from the frame surface of the frame body 24. The plate 26 may have a shape other than rectangular, depending on design conditions. The leg portion is not limited to the plate 26. For example, two triangular pieces 36 that open and close relative to the respective vertical frames 24c may be used, as indicated by the imaginary lines.

The torque hinges 32 are connected to the plate 26 by brackets 32a (see FIG. 1), and connected to the frame body 24 by brackets 32b. Each bracket 32a is substantially rectangular. Each bracket 32b is L-shaped along the corner of the frame body 24.

The band portion 28 is connected along the edge of the long-side frame 24b opposite to the foregoing long-side frame 24a. The band portion 28 has a length substantially equal to the total length of the long-side frame 24b, and has such a width that allows the side surfaces of the electronic apparatus 50 (see FIG. 7) to be supported. A plurality of anti-slip materials 38 are arranged along the longitudinal direction on one surface of the band portion 28. The anti-slip materials 38 are, for example, rubber. The band portion 28 is formed by pasting two cloth materials together. Since the band portion 28 is made of cloth materials, the band portion 28 is flexible and soft. The cloth materials are, for example, suede, felt, or leather, and have certain elasticity in the thickness direction. The same applies to the foregoing cloth material 22 (see FIG. 3). In the use posture of the stand 14 illustrated in FIG. 6, the flexible band portion 28 is bent from the long-side frame 24b and placed on the placement surface in a state in which the frame body 24 is maintained at an appropriate angle.

The bar 30 is provided along the distal edge 28b of the band portion 28 opposite to the connection edge 28a connected to the frame body 24. The bar 30 is a material that is attracted by a magnet. In this embodiment, the bar 30 is a round bar of an iron material (including alloys such as stainless steel). A round bar of an iron material has sufficient strength and is low in cost. If the bar 30 is circular in cross section and is a non-magnetic iron material, the bar 30 is appropriately rotatable inside the recessed portion 16 and the band portion 28 increases in the degree of freedom and is easy to handle. The bar 30 may, however, have another cross-sectional shape depending on design conditions. For example, the bar 30 may be rectangular in cross section to fit the recessed portion 16. The bar 30 is slightly longer than the band portion 28, and the parts protruding from the band portion 28 are each covered with a cap 30a. The bar 30 is a part to be inserted into the recessed portion 16, and has such a thickness and length that can be inserted into the recessed portion 16. The recessed portion 16 and the bar 30 are substantially equal in length, and the bar 30 is kept from being displaced in the longitudinal direction inside the recessed portion 16.

The cloth materials forming the band portion 28 are continuous beyond the band portion 28 so as to cover the frame body 24 and the bar 30 (see FIG. 5). In other words, the frame body 24 and the bar 30 are covered with the same cloth material as the band portion 28. Reference numeral 40 is such cloth material in the parts other than the band portion 28. The cloth material 40 is folded back so as to wrap the bar 30.

When attaching the stand 14 to the keyboard 12, the bar 30 is inserted into the recessed portion 16 as indicated by the imaginary lines in FIG. 5, as a result of which the bar 30 is attracted by the magnets 18 and fixed. Hence, the keyboard 12 and the stand 14 are combined. The operation of attaching the stand 14 to the keyboard 12 is thus easy. Since the recessed portion 16 is open rearward and downward, the bar 30 can be easily inserted into the recessed portion 16. No electrical connection is required between the keyboard 12 and the stand 14. The bar 30 is appropriately long, and accordingly is stable inside the recessed portion 16.

When the stand 14 is pulled from the keyboard 12, the bar 30 comes out of the recessed portion 16 against the force of attraction by the magnets 18. The stand 14 is thus detached from the keyboard 12. Here, the bar 30 can be easily pulled out of the recessed portion 16 because the force of attraction between the bar 30 and the magnets 18 is reduced for the following reasons.

Firstly, the bar 30 is not a magnet but an iron material, so that the force of attraction by the magnets 18 is appropriately reduced. Secondly, the bar 30 is a round bar and has a relatively small contact area with the planar recessed portion top surface 16a, so that the force of attraction by the magnets 18 is further reduced. Thirdly, given that the stand 14 is removed mainly by displacing it rightward in FIG. 5, the magnets 18 are located at the recessed portion top surface 16a and are not located on the extension in the removal direction, so that the magnetic action is limited. Fourthly, the bar 30 is covered with the cloth material 40 and accordingly there is a certain distance between the bar 30 and the magnets 18, which limits the acting magnetic force. In addition, the cloth material 40 easily slips over the recessed portion top surface 16a, which facilitates the sliding of the bar 30.

Thus, the bar 30 can be easily pulled out of the recessed portion 16, and the operation of detaching the stand 14 from the keyboard 12 is easy. Since the force of attracting the bar 30 by the magnets 18 is appropriately reduced, the band portion 28 is kept from being subjected to excessive tension and kept from being stretched or damaged. Moreover, since the band portion 28 has a length substantially equal to the total length of the long-side frame 24b of the stand 14 and the bar 30 is connected over the total length and the force acts evenly, local stress concentration is suppressed and damage is prevented.

Figure 7:
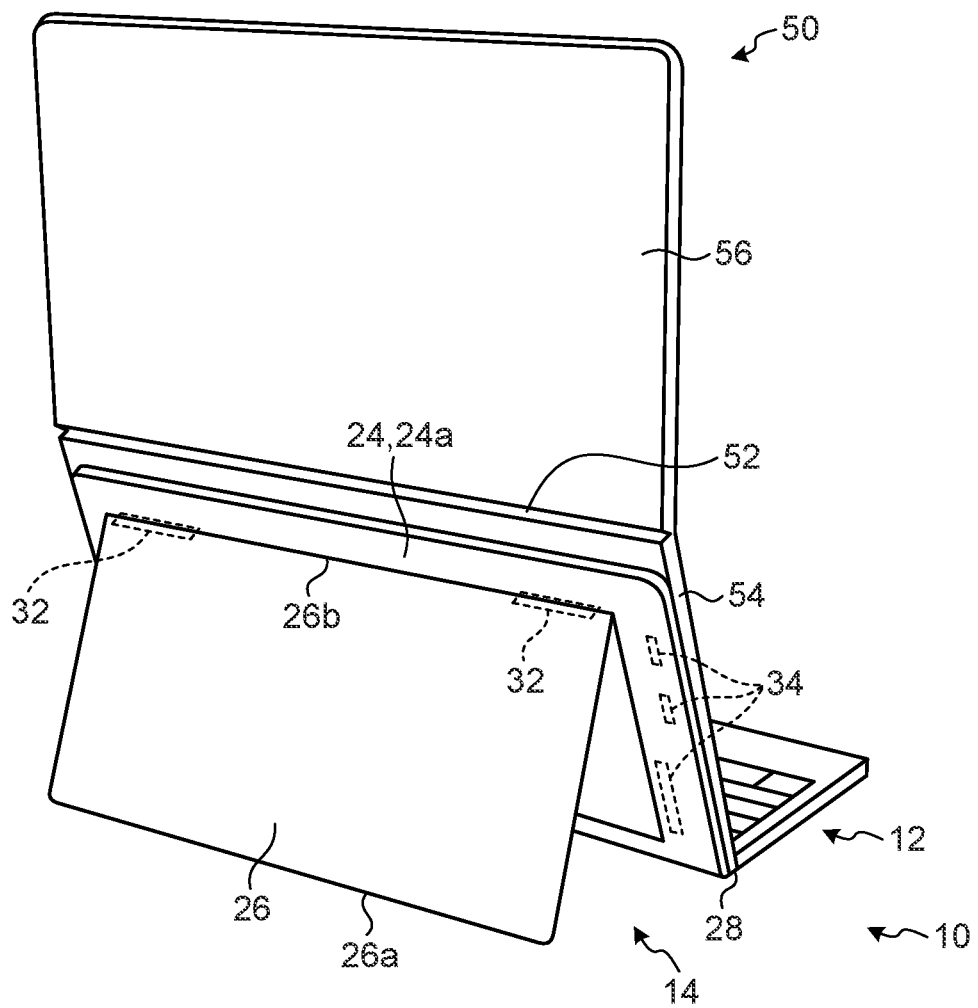
FIG. 7 is a schematic perspective view illustrating a state in which an electronic apparatus is placed vertically and leaned against the stand.
Figure 8:
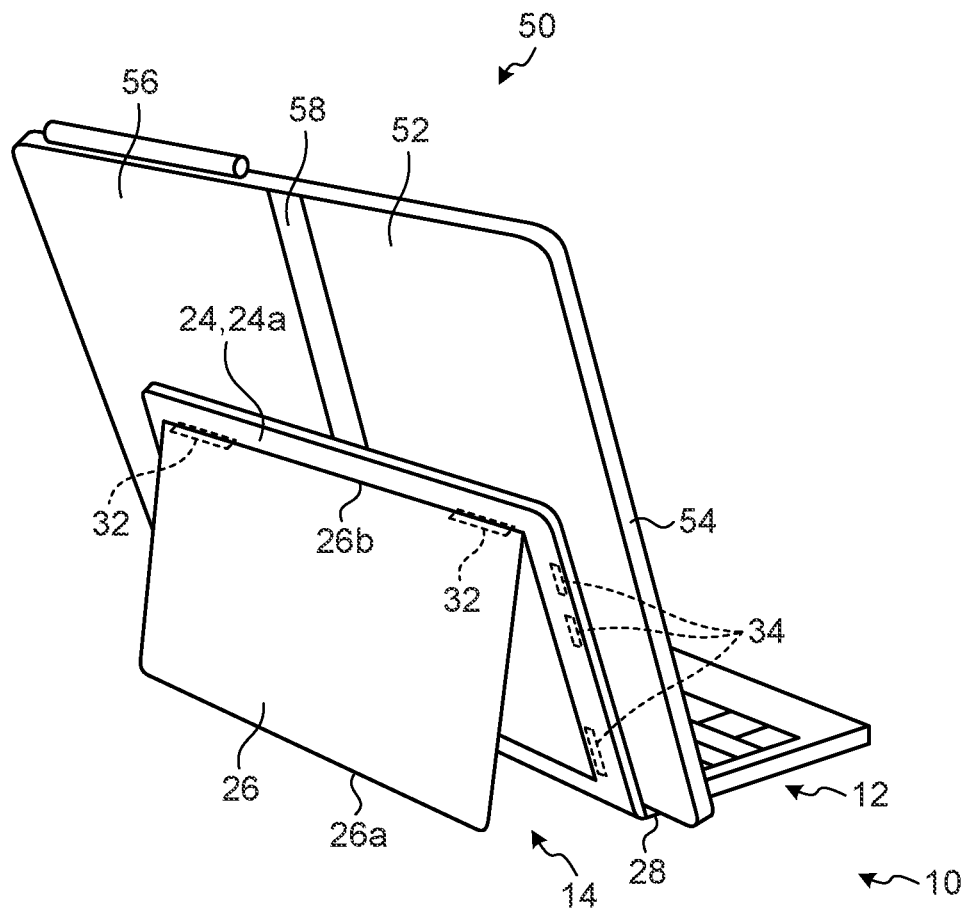
FIG. 8 is a schematic perspective view illustrating a state in which the electronic apparatus is placed horizontally and leaned against the stand.
Figure 9A:
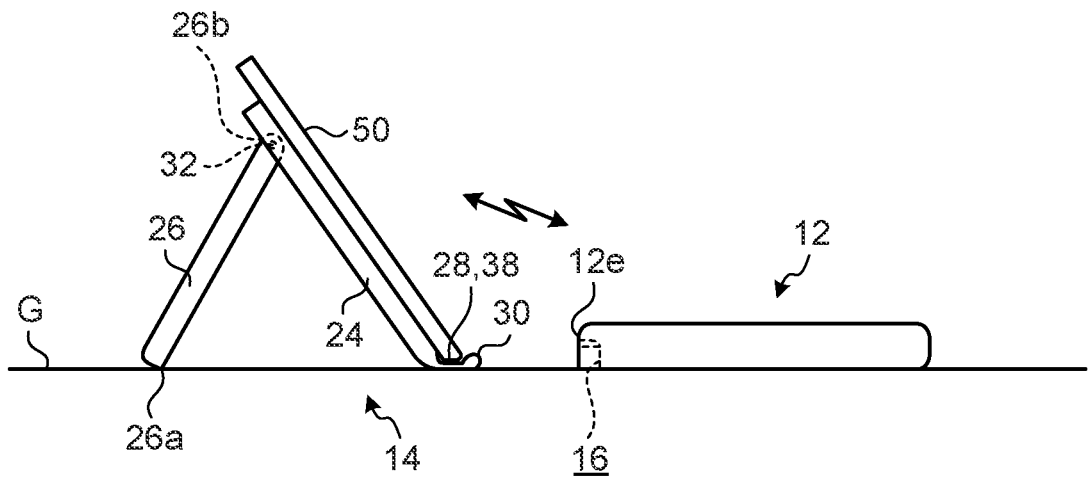
FIG. 9A is a schematic side view illustrating a state in which the electronic apparatus is leaned against the stand from which the keyboard is separated.
Figure 9B:
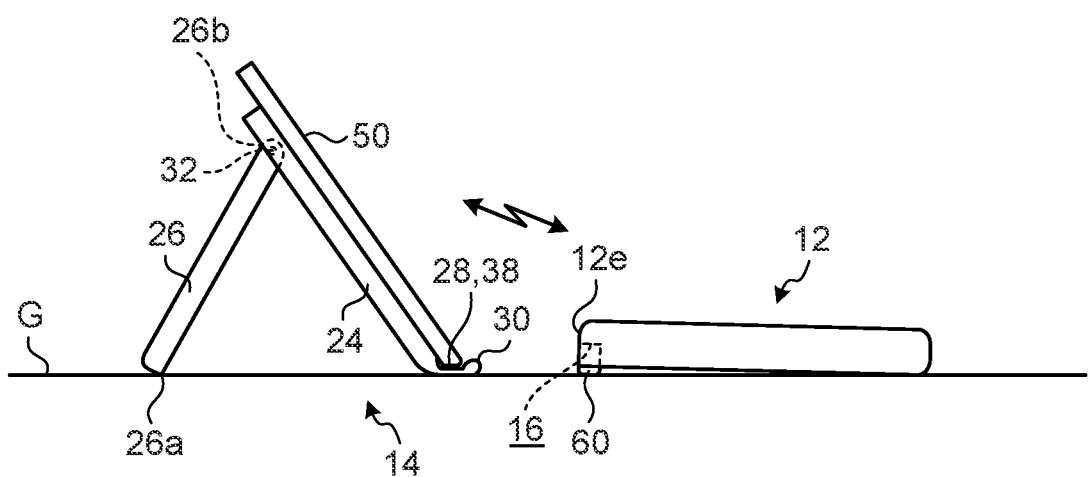
FIG. 9B is a schematic side view illustrating a state in which the electronic apparatus is leaned against the stand from which the keyboard is separated, and a leg portion is attached to the keyboard.
Figure 10:
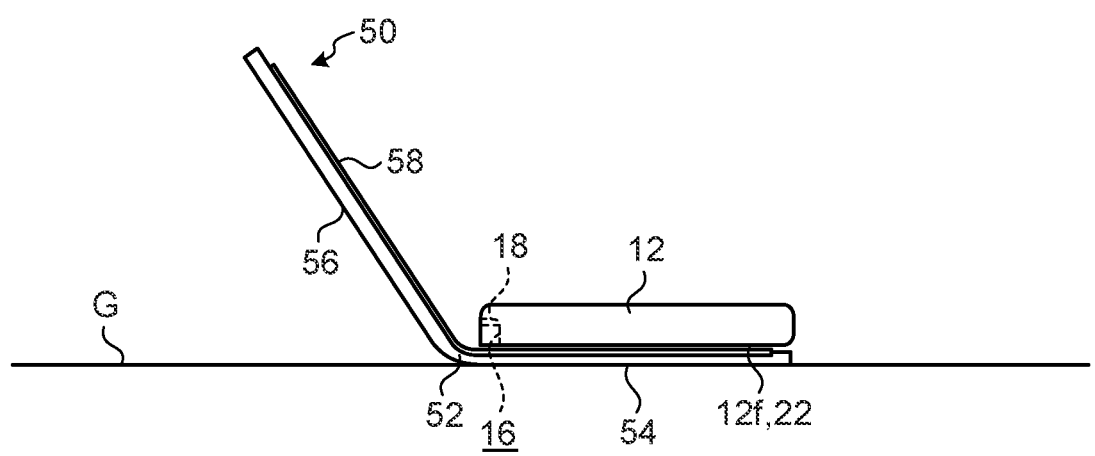
FIG. 10 is a schematic side view illustrating a state in which the keyboard is placed on the bent electronic apparatus.

FIG. 7 is a schematic perspective view illustrating a state in which the electronic apparatus 50 is placed vertically and leaned against the stand 14. FIG. 8 is a schematic perspective view illustrating a state in which the electronic apparatus 50 is placed horizontally and leaned against the stand 14. FIG. 9A is a schematic side view illustrating a state in which the electronic apparatus 50 is leaned against the stand 14 from which the keyboard 12 is separated. FIG. 9B is a schematic side view illustrating a state in which the electronic apparatus 50 is leaned against the stand 14 from which the keyboard 12 is separated and a leg portion 60 is attached to the keyboard 12. FIG. 10 is a schematic side view illustrating a state in which the keyboard 12 is placed on the bent electronic apparatus 50. Although the electronic apparatus 50 illustrated here is a foldable PC, the keyboard-stand set 10 is also applicable to other thin electronic apparatuses such as a tablet personal computer and a smartphone, as mentioned above.

The electronic apparatus 50 is a foldable PC. The electronic apparatus 50 includes a first chassis 54 and a second chassis 56 connected by a center hinge portion 52, and includes a foldable display 58 over substantially the entire surface from the first chassis 54 to the second chassis 56. The display 58 is, for example, a touch panel type organic electroluminescence (EL) display. The electronic apparatus 50 is capable of input using a software keyboard displayed on the display 58, and also capable of input using the keyboard 12. When the first chassis 54 and the second chassis 56 are folded at the hinge portion 52, the display 58 is folded, too. When not in use, the electronic apparatus 50 is reduced in size in a folded form in which the first chassis 54 and the second chassis 56 are completely folded (see FIG. 11).

As illustrated in FIG. 7, the keyboard-stand set 10 can hold the electronic apparatus 50 in a vertically upright state. The first chassis 54 includes attraction bodies such as magnets or iron materials at the positions corresponding to the magnets 34 of the frame body 24. In this case, the frame body 24 of the stand 14 supports only the first chassis 54 and the second chassis 56 protrudes from the stand 14, and accordingly the center of gravity is relatively high. However, the stand 14 magnetically attracts the first chassis 54, and the electronic apparatus 50 is stable. As illustrated in FIG. 8, the keyboard-stand set 10 can hold the electronic apparatus 50 in a horizontally upright state. In this case, there is no magnetic attraction between the stand 14 and the first chassis 54, but the electronic apparatus 50 is stable because the center of gravity is relatively low.

The bottom surface of the electronic apparatus 50 abuts the band portion 28, and is stable without slipping due to the action of the anti-slip materials 38. Moreover, the bottom edge of the electronic apparatus 50 abuts the rear surface 12e (see FIG. 4) of the keyboard 12, and thus is kept from being displaced forward. Since the plate 26 can be maintained at any angle by the action of the torque hinges 32, the inclination angle of the frame body 24 can be adjusted to make the display 58 easily viewable. Since the cloth material 40 is provided on the surface of the frame body 24, the rear surface of the electronic apparatus 50 is kept from being damaged.

The keyboard 12 is wireless, and does not need to be wiredly connected to the electronic apparatus 50. Hence, operations such as key input are possible even in the case where the keyboard 12 is detached from the stand 14 and placed at a certain distance as illustrated in FIG. 9A. If the keyboard 12 is moved out of sight, the electronic apparatus 50 is suitably used for video viewing. As illustrated in FIG. 9B, the keyboard 12 may be used with the below-described leg portion 60 being attached thereto. Even in the case where the keyboard 12 is detached from the stand 14, the electronic apparatus 50 is kept from being displaced forward due to the action of the anti-slip materials 38 of the band portion 28. Moreover, the bar 30 provided at the distal edge of the band portion 28 has a certain diameter, and accordingly acts to prevent displacement by abutting the bottom edge of the electronic apparatus 50.

When the keyboard-stand set 10 supports the electronic apparatus 50, the bar 30 is fitted into the recessed portion 16 and is not visible to the user. Moreover, the band portion 28, the frame body 24, and the plate 26 are hidden behind the electronic apparatus 50. The keyboard 12 is the only part of the keyboard-stand set 10 visible to the user, which is preferable in terms of design.

As illustrated in FIG. 10, the electronic apparatus 50 can be placed on the placement surface G and used in a bent state. In this case, the keyboard 12 may be used in a state of being placed on the top surface of one of the two chassis of the electronic apparatus 50 placed on the placement surface G (the first chassis 54 in this example). In this case, the stand 14 need not be used. Since the cloth material 22 is pasted to the bottom surface 12f of the keyboard 12, the display 58 is kept from being damaged. The electronic apparatus 50 may detect that the keyboard 12 is placed on the first chassis 54 or the second chassis 56 by a magnetic action or the like, and automatically disable the display of the chassis on which the keyboard 12 is placed out of the first chassis 54 and the second chassis 56 and enable only the display of the other chassis.

Figure 11:
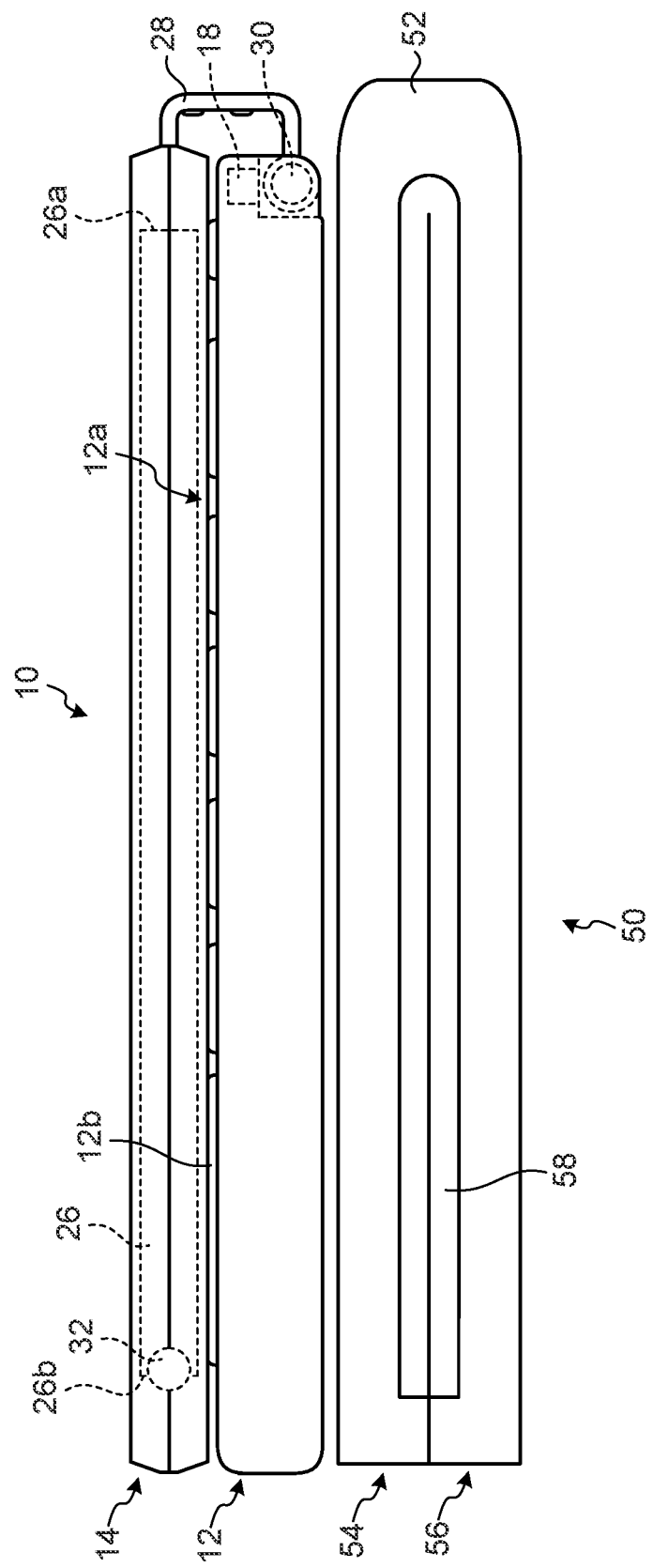
FIG. 11 is a schematic side view of the keyboard-stand set and the electronic apparatus in a folded state.

FIG. 11 is a schematic side view of the keyboard-stand set 10 and the electronic apparatus 50 in a folded state. As illustrated in FIG. 11, the keyboard-stand set 10 can be folded so that the keyboard 12 and the stand 14 will face each other by folding back the flexible band portion 28. The keyboard-stand set 10 and the electronic apparatus 50 in a folded state are substantially equal in size and are suitable for carrying together. The plate 26 is configured not to rotate downward in FIG. 11, so that no excessive force is applied to the keys 12a.

Thus, in the keyboard-stand set 10 according to this embodiment, the stand 14 and the keyboard 12 can be easily attached to each other simply by inserting the bar 30 of the stand 14 into the recessed portion 16 of the keyboard 12. When integrated, the stand 14 and the keyboard 12 are stably fixed to each other by the action of attraction between the bar 30 and the magnets 18. Since the bar 30 is an iron material, the force of attraction by the magnets 18 is appropriately limited, and therefore the bar 30 can be easily pulled out of the recessed portion 16.

The leg portion 60 will be described below.

As illustrated in FIG. 3, the leg portion 60 has an elongated shape along the recessed portion 16, and is detachably fitted into the recessed portion 16. As mentioned above, the bar 30 or the leg portion 60 can be selectively attached to the recessed portion 16 (see FIGS. 3 and 5).

Figure 12:
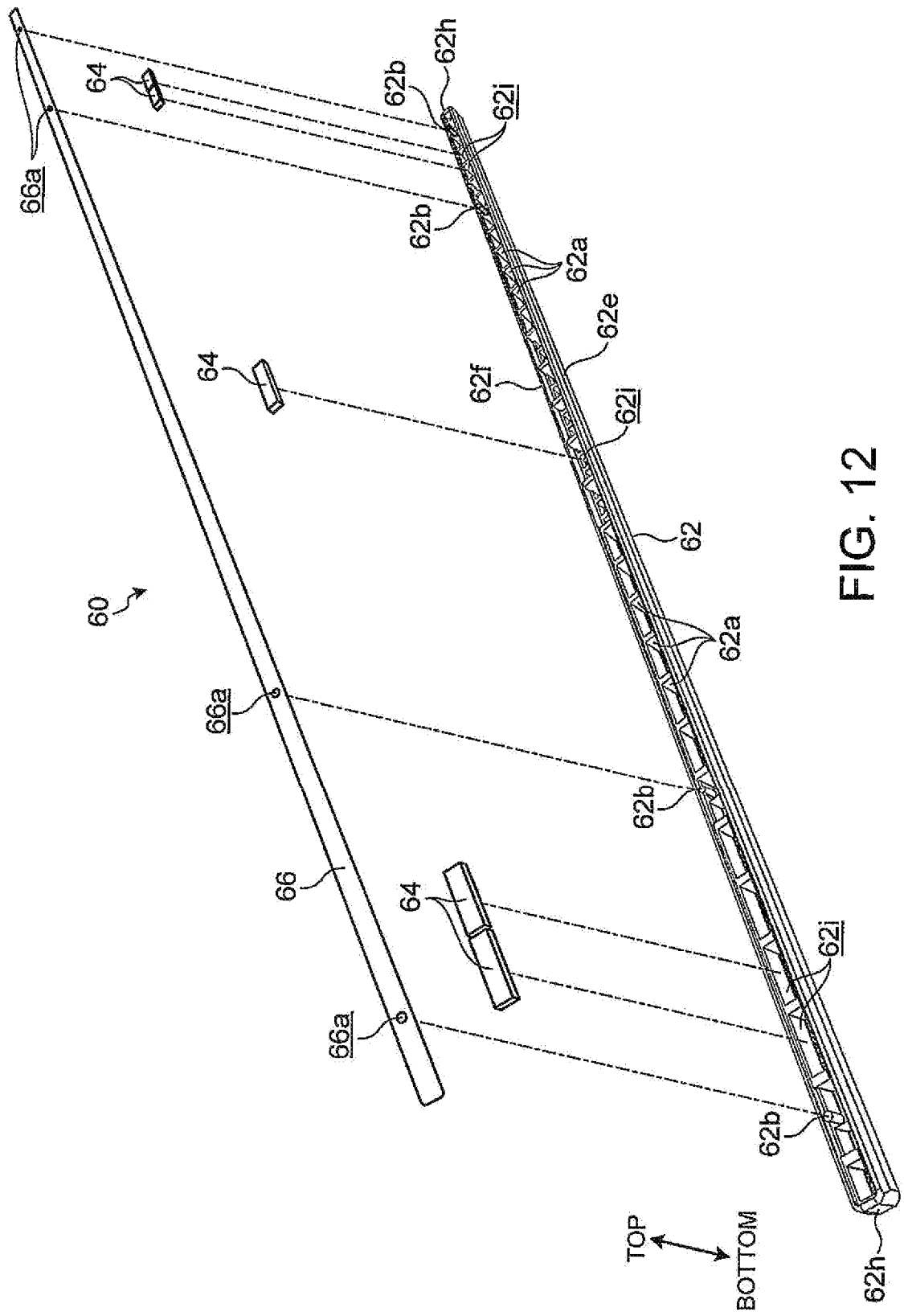
FIG. 12 is an exploded perspective view of the leg portion.
Figure 13:
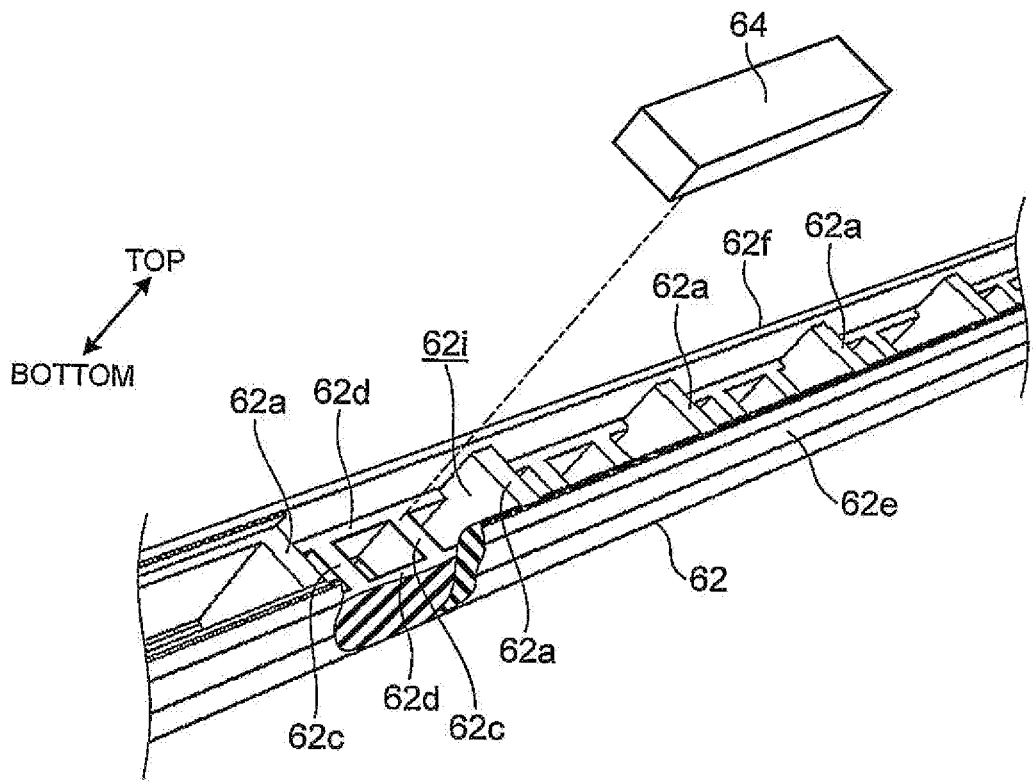
FIG. 13 is a partially enlarged exploded perspective view of a rubber leg and a magnet.
Figure 14:
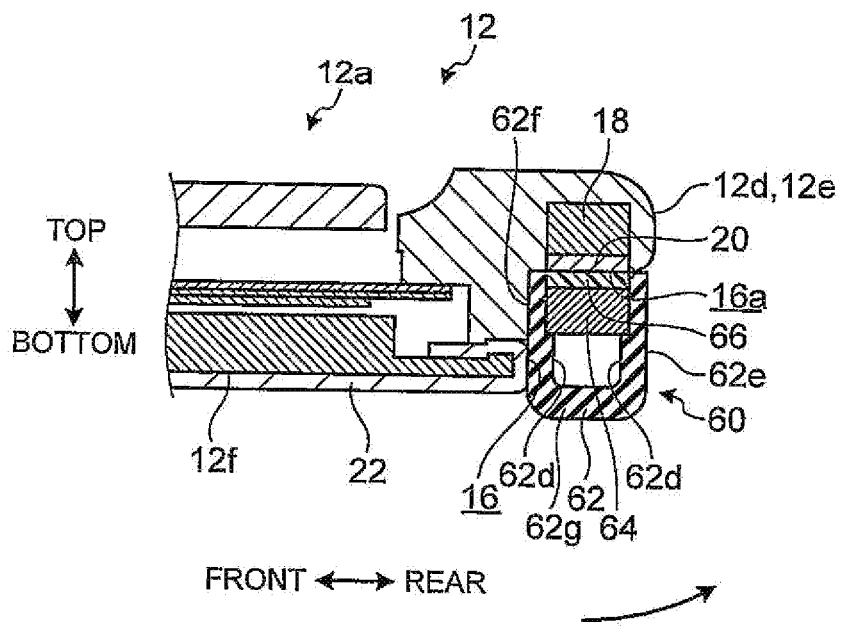
FIG. 14 is a partially enlarged sectional side view of the keyboard to which the leg portion is attached.
Figure 15:
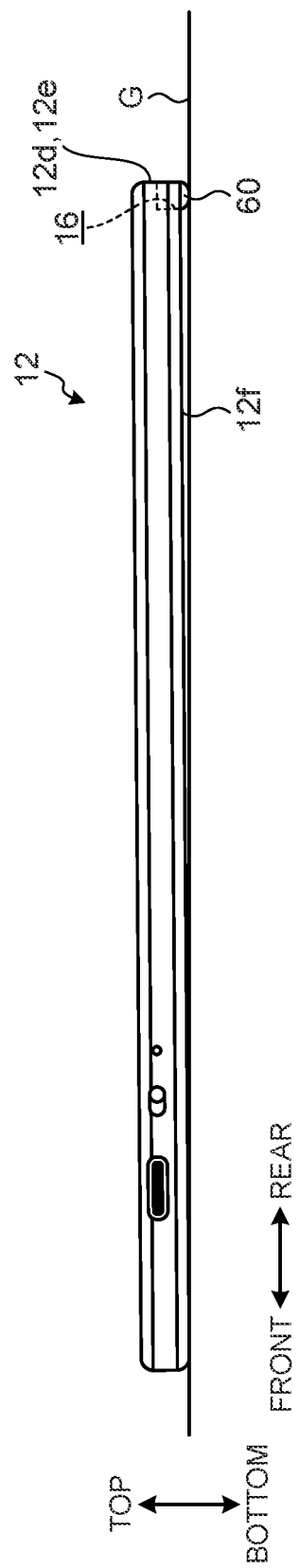
FIG. 15 is a side view of the keyboard to which the leg portion is attached.

FIG. 12 is an exploded perspective view of the leg portion 60. FIG. 13 is a partially enlarged exploded perspective view of a rubber leg 62 and a magnet 64. FIG. 14 is a partially enlarged sectional side view of the keyboard 12 to which the leg portion 60 is attached. FIG. 15 is a side view of keyboard 12 to which the leg portion 60 is attached.

As illustrated in FIG. 12, the leg portion 60 includes the rubber leg 62, a plurality of magnets 64, and a cover 66. The rubber leg 62 is a soft material such as polyurethane, rubber, or silicone, and has appropriate elasticity and anti-slip function. The rubber leg 62 has a rear wall 62e, a front wall 62f, a bottom wall 62g, and both side walls 62h, and is open upward. The leg portion 60 and the rubber leg 62 are symmetrical in the front-rear direction and the left-right direction, and can be used with the front and the rear reversed or the left and the right reversed.

As illustrated in FIG. 14, the recessed portion 16 and the leg portion 60 are substantially equal in the front-rear width. The rear surface of the rear wall 62e is substantially on the extension of the rear surface 12e, and the front wall 62f is substantially in contact with the front wall of the recessed portion 16. The cover 66 is in contact with the recessed portion top surface 16a. The part of the rubber leg 62 substantially corresponding to the bottom wall 62g protrudes from the bottom surface 12f. The bottom wall 62g is rounded at the front and rear corners.

As illustrated in FIGS. 12 and 13, the space between the rear wall 62e and the front wall 62f is partitioned by many partition walls 62a. Thus, the rubber leg 62 is not a solid structure, but is hollow except for the partition walls 62a. Hence, the rubber leg 62 is lightweight and does not require high material costs, and also has appropriate flexibility and can be easily attached to or detached from the recessed portion 16. In addition, many partition walls 62a ensure the strength of the leg portion 60. The rubber leg 62 is provided with four positioning pins 62b protruding upward from the bottom wall 62g. The positioning pins 62b have substantially the same height as the rear wall 62e and the front wall 62f.

The magnets 64 are fitted into the five spaces 62i partitioned by the partition walls 62a. The magnets 64 are each fitted so that its magnetism is oriented to attract the foregoing magnet 18. Each magnet 64 may be fixed, for example, by being adhered in the space 62i or being elastically held by the wall forming the space 62i.

Five spaces 62i and five magnets 64, i.e. equal in number to the magnets 18 (see FIG. 2), are located at the corresponding positions. In detail, a total of five magnets 18, i.e. two near each end of the rubber leg 62 and one at the center of the rubber leg 62, are provided. The spaces 62i and the magnets 64 need not necessarily be located at the positions exactly corresponding to the magnets 18, as long as the spaces 62i and the magnets 64 are located so that the magnets 64 can be attracted by the magnets 18 with an appropriate force.

In each space 62i in which the magnet 64 is provided, lateral walls 62d extend in the left-right direction in contact with the rear wall 62e and the front wall 62f, and two longitudinal walls 62c extend between the front and rear lateral walls 62d. The lateral walls 62d and the longitudinal walls 62c have the same height, and are lower than the rear wall 62e and the front wall 62f. The lateral walls 62d and the longitudinal walls 62c support the bottom surface of the magnet 64. The magnet 64 has a rectangular parallelepiped shape, and is stable with its front and rear surfaces being supported by the front wall 62f and the rear wall 62e, its left and right surfaces being supported by the partition walls 62a, its bottom surface being supported by the lateral walls 62d and the longitudinal walls 62c, and its top surface being supported by the cover 66.

The cover 66 has its bottom surface supported by the partition walls 62a, and is fitted into the space surrounded on four sides by the rear wall 62e, the front wall 62f, and the side walls 62h to cover the upward opening of the rubber leg 62 and also cover the magnets 64 to retain the magnets 64. The cover 66 is fixed to the partition walls 62a by adhesion or the like. The cover 66 has four positioning holes 66a, into which positioning pins 62b are inserted for positioning. The positioning pins 62b hardly protrude from the cover 66. The cover 66 is, for example, a resin plate.

The leg portion 60 having such a structure is fitted into the recessed portion 16 of the keyboard 12, and stably fixed as a result of the magnets 18 and the magnets 64 attracting each other (see FIGS. 3, 5, and 14). The leg portion 60 attached to the recessed portion 16 can be regarded substantially as part of the keyboard 12. The leg portion 60 may be attached to the recessed portion 16 from below or from behind.

The bottom part of the leg portion 60 slightly protrudes from the bottom surface 12f, so that the keyboard 12 has a slight elevation angle to ease key input (see FIGS. 9B and 15). The leg portion 60 may not be used depending on the user's judgment (see FIG. 9A). The leg portion 60 not in use may be configured to be fixed to part of the keyboard 12 other than the recessed portion 16 or any part of the stand 14 magnetically or by other means.

Pasting the cloth material 22 to the bottom surface 12f of the keyboard 12 has a certain anti-slip effect on the placement surface G, as mentioned above. By attaching the leg portion 60 including the rubber leg 62, the anti-slip effect can be further enhanced and displacement during key input and the like can be prevented. The recessed portion 16 and the leg portion 60 are substantially equal in length, and the leg portion 60 is kept from being displaced in the longitudinal direction inside the recessed portion 16. The leg portion 60 is automatically positioned in the left-right direction by the attraction between the magnets 18 and the magnets 64.

The leg portion 60 is fixed to the keyboard 12 with appropriate strength by the attraction between the magnets 18 and the magnets 64, and is prevented from coming off even when an external force is applied, for example, during operation of the keyboard 12 or during sliding movement on the placement surface G. Meanwhile, the leg portion 60 and the keyboard 12 can be separated from each other because they are fixed magnetically. In particular, since the recessed portion 16 is open rearward, the leg portion 60 can be easily detached by placing a finger on the bottom surface of the leg portion 60 and twisting it rearward as indicated by the arrow in FIG. 14.

The leg portion 60 is not limited to including the magnets 64, as long as it includes any member attractable by the magnets 18 and is detachably fitted into the recessed portion 16 along the recessed portion 16 and fixed by attraction. For example, the magnets 64 may be omitted and the cover 66 may be a material attracted by the magnets 18, such as a tin plate. Such a structure is inexpensive because the magnets 64 are unnecessary. Moreover, there is no need to fit the magnets 64 into the spaces 62i. The cover 66 made of a tin plate acts like a core material and has high strength, so that elongation can be prevented while maintaining flexibility.

The present invention is not limited to the foregoing embodiment, and can be freely modified without departing from the gist of the present invention.

The invention claimed is:

1. A keyboard that performs wireless input to an electronic apparatus, the keyboard comprising:
   a recessed portion along a rear edge of the keyboard and open from a rear surface of the keyboard to a bottom surface of the keyboard;
   a keyboard magnet is between a top surface of the keyboard and a recessed portion top surface which is a top surface of the of the recessed portion; and
   an elongated keyboard leg portion includes a U-shaped rubber leg at a bottom end, a cover at an opposite top end and a keyboard leg portion magnet therein;
   wherein the keyboard leg portion and an elongated bar of a stand to support the keyboard are selectively attachable in and along the recessed portion;
   wherein the keyboard leg portion extends beyond the bottom surface of the keyboard when the keyboard leg portion is attached in and along the recessed portion;
   wherein the keyboard leg portion fills the entire recessed portion in a longitudinal cross section view when the keyboard leg portion is attached in and along the recessed portion;
   wherein the bar fills less than the entire recessed portion in a longitudinal cross section view when the bar is attached in and along the recessed portion; and
   wherein the bar and the keyboard leg portion substantially extend along a width of the recessed portion.

2. The keyboard according to claim 1, wherein the recessed portion top surface is planar.

3. A stand that supports an electronic apparatus in an upright state, the stand comprising:
   a frame body that abuts a rear surface of the electronic apparatus;

a plurality of frame body magnets embedded in and along opposite side edges of the frame body;

a stand leg portion that is connected to part of the frame body via a torque hinge, and partly abuts a placement surface when the frame body is open relative to a frame surface of the frame body;

a flexible band portion that is connected along one side edge of the frame body, and has a width that allows side surfaces of the electronic apparatus to be supported; and an elongated bar along a distal edge of the flexible band portion opposite the one side edge of the frame body, wherein the bar is a magnetic material, wherein the bar and a keyboard leg portion are selectively attachable in and along a recessed portion of a keyboard;

wherein the bar extends to a point less than a bottom surface of the keyboard when the bar is attached in and along the recessed portion;

wherein the bar fills less than the entire recessed portion in a longitudinal cross section view when the bar is attached in and along the recessed portion;

wherein the keyboard leg portion fills the entire recessed portion in a longitudinal cross section view when the keyboard leg portion is attached in and along the recessed portion; and wherein the bar and the keyboard leg portion substantially extend along a width of the recessed portion.

4. The stand according to claim 3, wherein the bar is an iron material.

5. The stand according to claim 3, wherein the band portion includes two cloth materials that are elastic in a thickness direction, and wherein the cloth materials cover the frame body and the bar.

6. The stand according to claim 3, wherein the bar is a round bar.

7. The stand according to claim 3, wherein the torque hinge is connected to the stand leg portion at another side edge of the frame body on a side farther from the flexible band portion, and wherein the stand leg portion has a rectangular shape that closes an opening of the frame body when fitted into the opening.

8. The stand according to claim 3, wherein an anti-slip material is on a surface of the band portion.

9. The stand according to claim 3, wherein the electronic apparatus includes an apparatus magnet, and wherein one of the plurality of frame body magnets is at a position to be attractable by the apparatus magnet.

10. A keyboard-stand set comprising:

a keyboard that performs wireless input to an electronic apparatus; and a stand that supports the electronic apparatus in an upright state, wherein the keyboard includes:

a recessed portion along a rear edge of the keyboard and open from a rear surface of the keyboard to a bottom surface of the keyboard;

a keyboard magnet in the keyboard wherein the keyboard magnet is between a top surface of the keyboard and a recessed portion top surface which is a top surface of the recessed portion; and an elongated keyboard leg portion includes a U-shaped rubber leg at a bottom end, a cover at an opposite top end and a keyboard leg portion magnet therein;

wherein the keyboard leg portion and an elongated bar of the stand are selectively attachable in and along the recessed portion;

wherein the keyboard leg portion extends beyond a bottom surface of the keyboard when the keyboard leg portion is attached in and along the recessed portion;

wherein the keyboard leg portion fills the entire recessed portion in a longitudinal cross section view when the keyboard leg portion is attached in and along the recessed portion;

wherein the stand includes:

a frame body that abuts a rear surface of the electronic apparatus;

a plurality of frame magnets embedded in and along opposite side edges of the frame body;

a stand leg portion that is connected to part of the frame body via a torque hinge, and partly abuts a placement surface when the frame body is open relative to a frame surface of the frame body;

a flexible band portion that is connected along one perimeter edge of the frame body, and has a width that allows side surfaces of the electronic apparatus to be supported; and the bar is along a distal edge of the flexible band portion opposite the one perimeter edge of the frame body, wherein the bar is a magnetic material, wherein the bar extends to a point less than the bottom surface of the keyboard when the bar is attached in and along the recessed portion;

wherein the bar fills less than the entire recessed portion in a longitudinal cross section view when the bar is attached in and along the recessed portion, wherein the recessed portion has a width and a height that allow the bar to be inserted therein, and wherein the bar and the keyboard leg portion substantially extend along the width of the recessed portion.

* * * * *